July 26, 1938.  J. T. ROBERTS  2,124,794

PISTON RING EXPANDER

Filed March 11, 1937

Inventor
John T. Roberts
by Rippey & Cassidy
His Attorneys.

Patented July 26, 1938

2,124,794

UNITED STATES PATENT OFFICE 2,124,794

PISTON RING EXPANDER

John T. Roberts, St. Louis, Mo.

Application March 11, 1937, Serial No. 130,226

4 Claims. (Cl. 309—41)

This invention relates to resilient expanders adapted to be placed back of rings in piston ring grooves for the purpose of expanding rings against cylinder walls, both for increasing the pressure against the wall and to give a uniform pressure throughout the circumference of the ring.

An object of the invention is to provide piston ring expanders which will be simple in construction, economical to manufacture, easy to install, efficient in service and of long life.

Another object of the invention is to provide spring clips or expanders which may be placed in the ring grooves and which may be so constructed and arranged as to hold their position against displacement when once installed.

Another object of the invention is to provide a method for making piston ring expanders which will economically produce an efficient device.

Other and specific objects of the invention will be apparent from the following detail description, taken in connection with the accompanying drawing.

Figure 1:
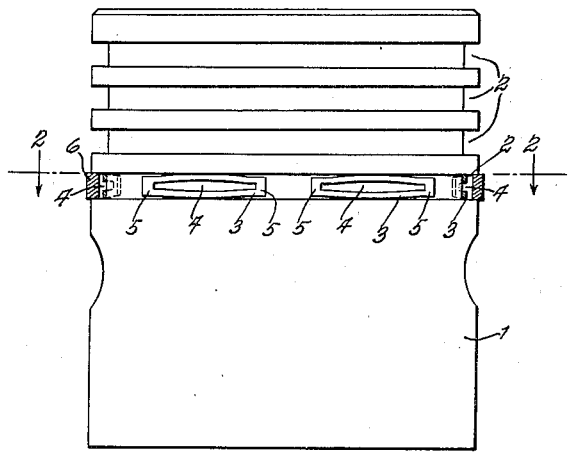
Fig. 1 is a view of a piston with expanders embodying this invention, installed behind a ring with the ring partially in section.
Figure 2:
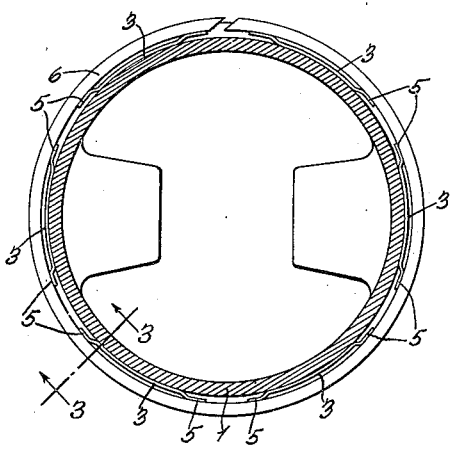
Fig. 2 is a horizontal section view on line 2—2, Fig. 1.
Figure 3:
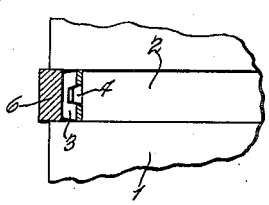
Fig. 3 is a detail section on line 3—3, Fig. 2.

In the drawing there is shown a conventional piston 1, suitable for use in internal combustion engines, and having ring grooves 2 which are adapted to receive resilient metallic rings so arranged and constructed as to bear with considerable pressure against the wall of a cylinder. Often the resiliency of the ring itself affords insufficient pressure against the cylinder wall and it has heretofore been suggested that resilient expanders be placed in at least one groove, preferably the lower one, behind the ring to afford additional pressure. In the accompanying illustration novel expanders 3 are shown in the bottom groove only, but it will be understood that such expanders may be used in any one or in all of the grooves, depending upon the particular circumstances of a particular case.

As specifically shown in the drawing, six of the expanders 3 are used behind the single ring, and while this particular number is recommended it will be understood, of course, that a less or greater number may be used while securing the advantages of the invention.

The expander 3 is constructed preferably of resilient sheet steel. It has a longitudinal slot 4 extending throughout the major portion of its length. When complete the central portion of an expander, that is the portion adjacent the slot, is of greater width than the width of the piston ring groove 2, while the ends 5 of the expander are of less width than the groove. Thus the comparatively narrow ends may be inserted in the slot and used in readily placing the device in the ring groove while the slot affords resiliency and permits the sides of the expander to be forced together enabling the device to be placed in the slot and affording a resiliency to hold it in place after it is once positioned. The construction of the expander is such that it may be inserted in place without difficulty, and without the use of intricate tools, a common screwdriver being sufficient to exert the pressure necessary for placing or forcing the expander into its proper place in the ring groove. The arrangement of the expander in such a manner that it grips the side walls of the groove tightly is advantageous, not only in holding the expander in proper position in the groove while the ring is being placed in position, but in addition has an important function to perform during the operation or use of the piston. As shown in the drawing, the expanders 5 are placed in spaced relationship to each other circumferentially in the groove. Unless some means are provided for holding the expanders in the predetermined spaced relationship they will have a tendency to creep and after a short period of service may be altogether and entirely out of their original and intended position. By this invention, however, means are provided whereby the expanders tightly grip the side walls of the groove thus holding them in their original position, overcoming their tendency to creep and therefore maintaining them in their proper and predetermined relationship one with another.

For the purpose of clarity, in illustration and explanation, the dimensions of the expander are somewhat exaggerated in the accompanying drawing, as compared to actual preferred practice, the details of which will be presently described. The expanders are cut from flat ribbons of resilient steel of the proper thickness and of a width .005 inch less than the width of the ring groove. After the slot 4 has been cut the expander is spread laterally at the slot .020 inch, thus making the expander a maximum of .015 inch wider than the ring groove. It will be understood that these sizes are not critical but are given merely as exemplary for better understanding of the construction and operation of the device. Since the width of the device at its ends is not increased beyond the width of the stock, sufficient clearance is permitted to readily insert or start the insertion of the expander in the ring groove. After it is thus started a thrust with any suitable instrument, such as a screwdriver, on the center of the device will push it to the bottom wall of the ring groove where it will be held in position by the resiliency of the device.

Figure 4:
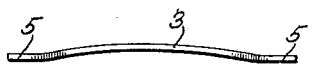
Fig. 4 is an edge view of the expander.
Figure 5:
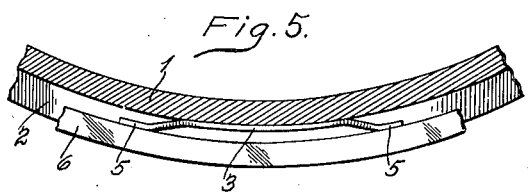
Fig. 5 is an enlarged detail horizontal section through a piston with an expander behind a ring.
Figure 6:
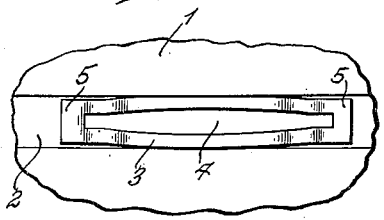
Fig. 6 is a detail view of an expander in place in the ring groove.

The expander is formed generally as an arc as best shown in Fig. 4, with the ends 5 preferably straight. In placing the expander in the ring groove it is placed tangential to the circumference of the bottom wall of the ring groove, with the ends 5 extended and engaging the inner surface of a packing ring 6 fitted in the groove.

The device is such as lends itself to simplicity in manufacture and the novel method of manufacture which will presently be described in detail, economically produces the article.

As stated above, the article is formed out of stock comprising steel ribbon of uniform width and thickness and slightly less in width than that of the ring groove with which the article is intended to be used. Strips of proper length may be sheared from the ribbon stock after which it is subjected to an operation or operations which will form the slot 4 and form the arc. This may be done preferably in one operation since it is convenient to produce a die which will at the same time form the slot and bend or form the straight piece into an arc. In doing this the arc is preferably formed only along that part of the device in which the slot is formed, thus leaving the unslotted ends 5 straight as in the original stock. After the slot has been formed the device is spread at the slot to widen the device about its center to a width beyond that of the intended ring groove. It will thus be seen that there are four steps in the manufacture of the article from the ribbon stock: cutting the ribbon into the proper lengths; slotting the pieces; bending the pieces; and spreading at the slot. Some of these operations may be combined and their sequence is not essential, except of course that the device must be spread after the slot is formed.

Various changes may be made in the details of construction without departing from the spirit of this invention, and parts of the invention may be used to advantage without the whole.

I claim:

1. In a piston having a circumferential groove with a bottom wall and side walls and a packing ring mounted in the groove, the improvement comprising an expander which is an elongated strip of resilient metal having its center portion engaging the bottom wall of the groove and the ends extending longitudinally to engage the inner surface of the ring, having its ends smaller in width than the groove and its center normally wider than the groove and having a longitudinal slot intermediate the ends and at the center portion whereby the expander is resilient sidewise permitting it to be inserted in the groove and when inserted to engage the side walls of the groove.

2. A piston ring expander adapted to set in the bottom of a piston ring groove and bear at both ends against the inner surface of a ring, comprising a strip of resilient metal longitudinal in form with its ends less in width than the said groove, having a longitudinal slot intermediate its ends and having its center portion adjacent said slot wider than the groove, whereby the resiliency of the expander at the slotted portion enables the device to be inserted in said groove and to engage the side walls of the groove preventing displacement while the ends extend tangentially to engage the inner surface of a piston ring placed in the groove.

3. A piston ring expander adapted to set in the bottom of a piston ring groove and bear at both ends against the inner surface of a ring, comprising a strip of resilient metal arcuate in form with its ends less in width than the said groove, having a longitudinal slot intermediate its ends and its center portion adjacent said slot wider than the groove, whereby the resiliency of the expander at the slotted portion will enable the device to be inserted in said groove and to engage the side walls of the groove preventing displacement while the ends extend outwardly to engage the inner surface of a piston ring placed in the groove.

4. A piston ring expander adapted to set in a piston ring groove comprising a strip of resilient metal, having a portion adapted to bear against the inner surface of a ring and another portion wider than said groove having a slot along said portion giving it sidewise resiliency, thereby permitting said portion being contracted and inserted in the groove and causing its edges to grippingly engage side walls of the groove.

JOHN T. ROBERTS.